Oct. 3, 1961  R. CASTRO ET AL  3,002,381
AIRCRAFT INSTRUMENTATION
Filed March 15, 1957  3 Sheets-Sheet 2
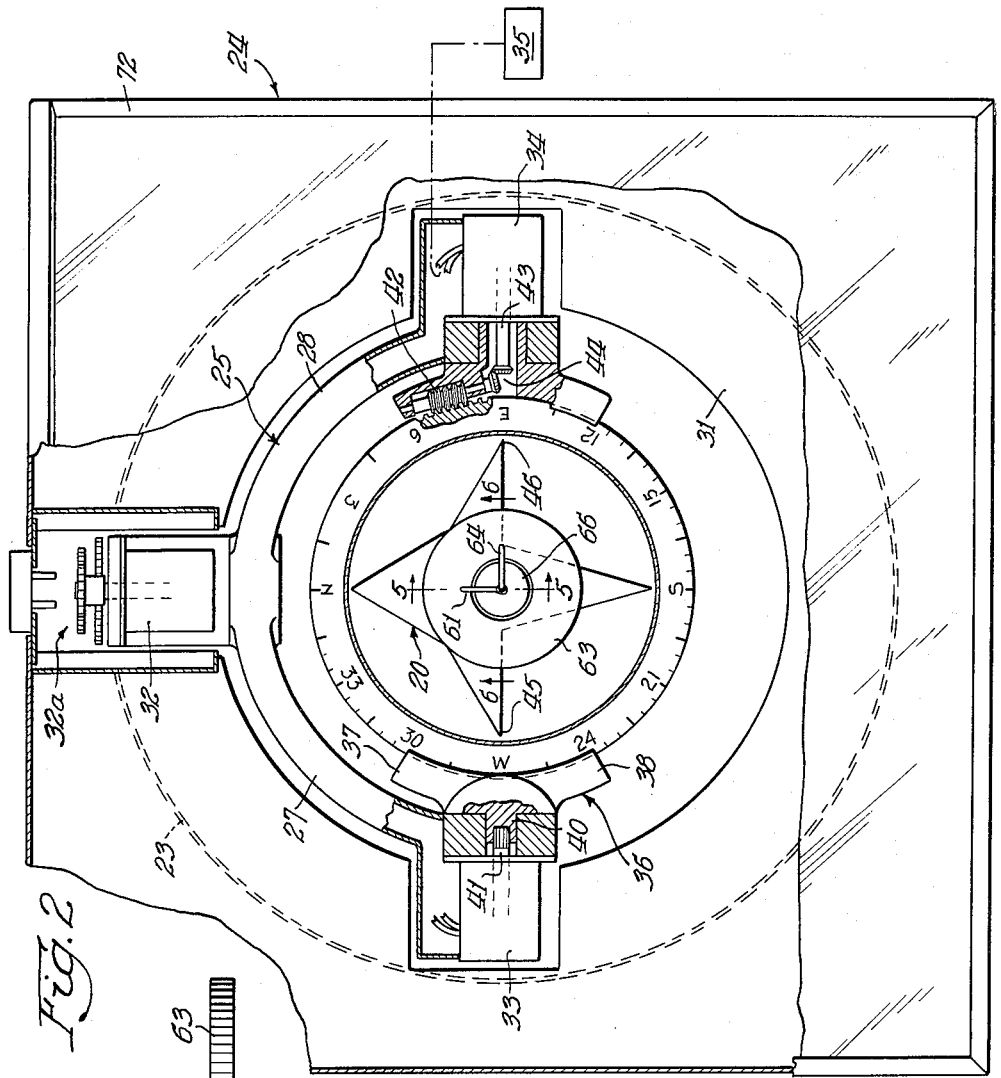
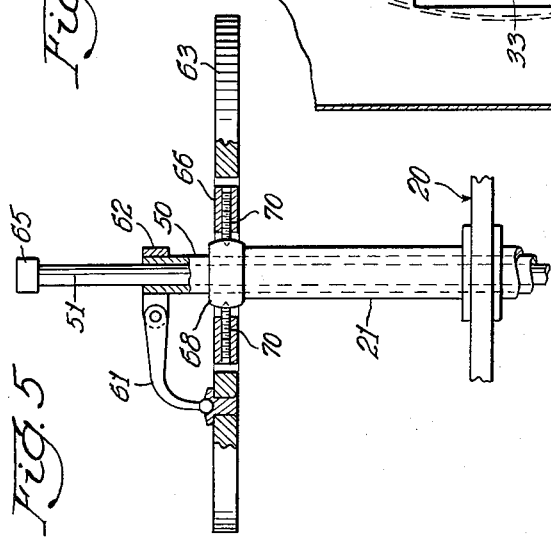
Inventors:
Raoul Castro and
Alexander M. Hasse
By: Joseph R. Dwyer
Atty.

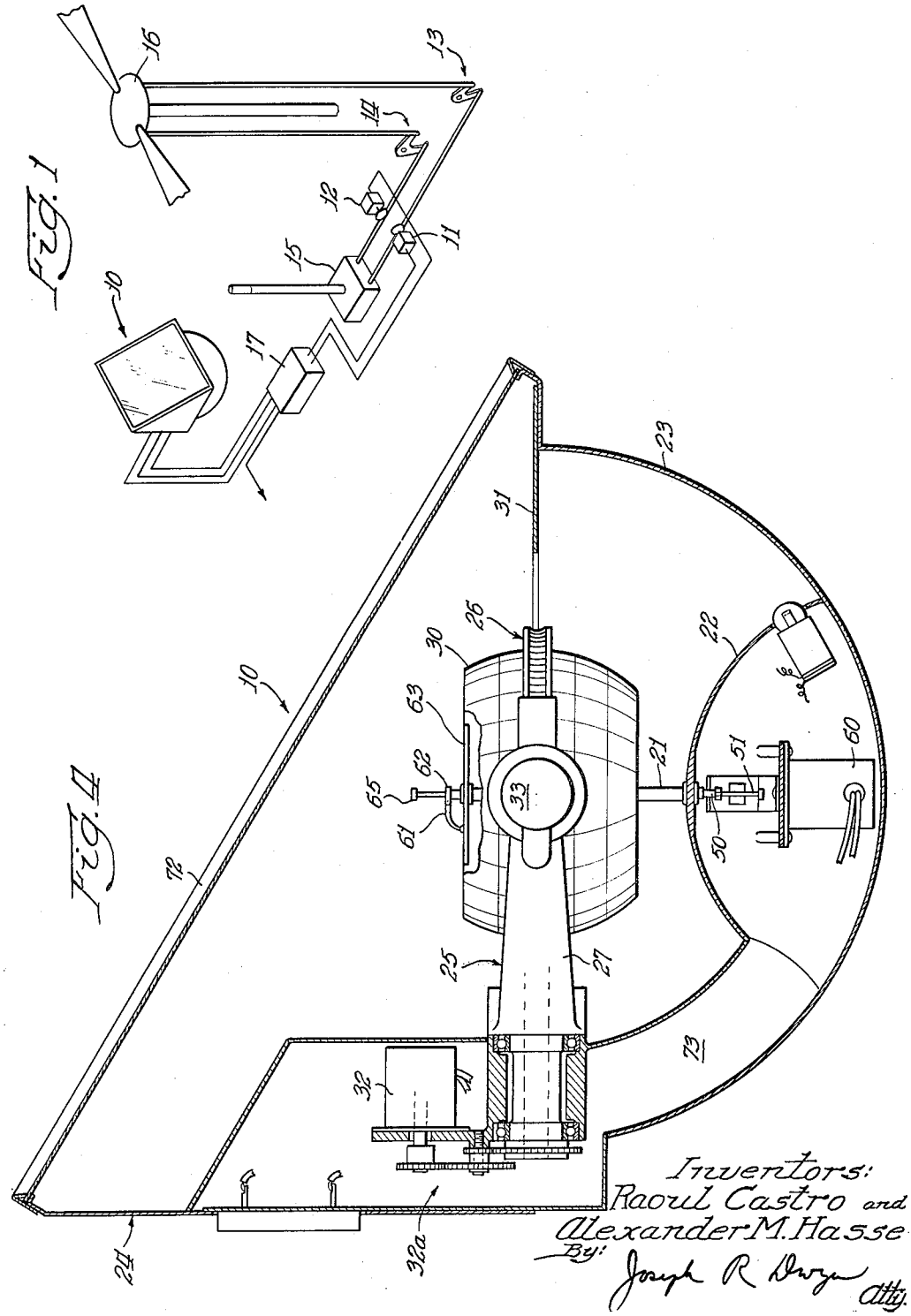

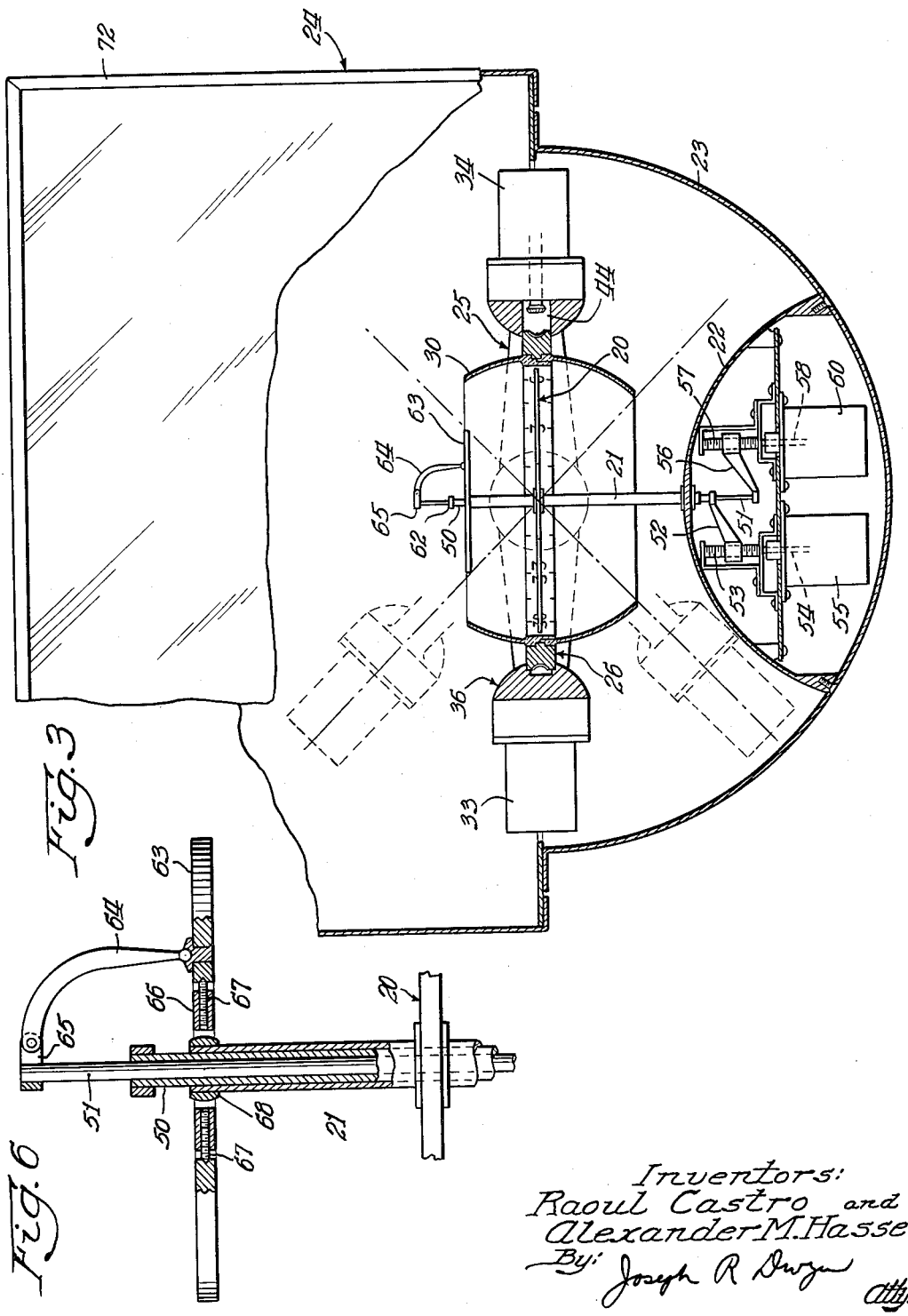

United States Patent Office 3,002,381
Patented Oct. 3, 1961

3,002,381
AIRCRAFT INSTRUMENTATION
Raoul Castro, Brookfield, Ill. (P.O. Box 414, Winfield, Ill.), and Alexander M. Hasse, 2017 Lincoln, Fort Worth, Tex.
Filed Mar. 15, 1957, Ser. No. 646,464
11 Claims. (Cl. 73—178)

This invention relates in general to aircraft instrumentation and relates in particular to a new and improved aircraft instrumentation especially adaptable for helicopters enabling instrument flight of the helicopter by indicating the attitude of the swash plate of the helicopter relative to the horizon as well as the attitude of the helicopter fuselage relative to the horizon.

In the field of aircraft instrumentation, one of the major problems of instrument flying with conventional instruments is the interpretation required by the pilot from the information presented to him. A pilot flying under visual flight conditions is accustomed to interpreting the attitude of the aircraft by judging of the position of the wings, for example, with respect to the horizon—a three-dimensional orientation. On the other hand, when instrument flying is required, the pilot must re-evaluate and interpret the attitude of the aircraft according to information presented to him on the conventional vertically disposed instruments on a panel—a two-dimensional presentation. The pilot's ability, therefore, to fly the same aircraft with visual reference to the ground as compared to flying when the ground is obscured, is largely dependent on the information presented to him and his interpretation thereof. Obviously, when a pilot is accustomed to a three-dimensional orientation of the plane with respect to the ground (which, by the way, is also the condition under which he learned to fly), orientation of the plane by the two-dimensional information presented to him on the conventional instruments requires interpretation time. This time lag between the actual events as they are happening with respect to the plane and as finally interpreted (even if correctly interpreted) may be dangerous under certain circumstances.

If, therefore, the pilot can be presented with information more closely resembling actual events, or otherwise stated, more closely relating to what the pilot is accustomed to perceiving under visual flight conditions, the time lag and any errors due to misinterpretation will be reduced. The accomplishment of this end or object represents the primary purpose of our invention.

Another and important feature of this invention also in connection with the primary object of our invention, is the adaptation thereof to a helicopter.

We propose to accomplish the primary object and feature of our invention by providing a miniature replica of the aircraft fixedly mounted on the aircraft itself (or on some part thereof) so as to move about the three principal axes of movement with the aircraft itself. This replica is also disposed for free universal movement with respect to and within a gyroscopically fixed means representing the horizon and means by which the heading of the aircraft is represented. It is important to note that with this miniature replica directly connected to the aircraft itself, any pitch, roll, yaw or change of heading, of the aircraft will be immediately reflected in the position of the replica with respect to the horizon indicating means and the heading indicating means and since both these means encompass or surround the replica, a true three-dimensional presentation is accomplished as will be more clearly understood hereinafter. To especially adapt our invention for helicopter flying, we have provided a miniature replica of the helicopter swash plate surrounded by a second gyroscopically fixed means representing the horizon. Any change in the position of the swash plate of the helicopter with respect to the horizon will be reflected three-dimensionally in our invention. As is well-known, the position of the helicopter swash plate with respect to the horizon regardless of the attitude of the fuselage of the helicopter is determinative of whether the helicopter flies sideward, backward or hovers. Consequently, with the attitude of the helicopter swash plate with respect to the horizon being duplicated in our instrument and with the attitude of the aircraft with respect to the horizon also being duplicated, there is accomplished three-dimensional presentation of the events relating to the helicopter in the exact manner in which the pilot is accustomed to perceiving them.

Incidentally, it is important to note in connection with our instrument that we have accomplished all of this in one compact instrument. This accomplissment in part is due to a new and improved means of moving the swash plate attitude indicator.

Accordingly, it is still another goal of our invention to provide a new and improved helicopter instrumentation which closely simulates visual flying conditions reducing the time required to respond to the information presented; all in one compact device.

These and other objects of our invention will become apparent from the following description when taken in connection with the accompanying drawings in which:

FIGURE 1 is a schematic view, partly in perspective, illustrating the control mechanism of the present invention in its relationship to the swash plate of the helicopter and the pilot's controls;

FIGURE 2 is a plan view partially in section showing to advantage the miniature replica of the aircraft as disposed for universal movement with respect to the means representing the horizon and the compass, all constructed in accordance with the teachings of our invention;

FIGURE 3 is an elevational view partially in section showing to advantage the helicopter swash plate attitude indicating mechanism of our invention;

FIGURE 4 is a side view, partially in section, showing to advantage the aircraft instrument constructed in accordance with the teachings of our invention as arranged for mounting on the aircraft instrument panel;

FIGURE 5 is an enlarged detail view of the helicopter swash plate attitude indicating mechanism taken along line 5—5 of FIGURE 2; and FIGURE 6 is an enlarged detail view of the helicopter swash plate attitude indicating mechanism taken along line 6—6 of FIGURE 2.

Referring now to the drawings where like reference characters designate like parts throughout the several views, there is shown particularly in FIGURE 1, our aircraft instrument indicated in its entirety as 10, suitably connected to a pair of servo motors or like devices 11 and 12 which in turn are coupled to a pair of control means such as rods and link means, indicated in their entirety as 13 and 14 respectively. Movement of the control stick assembly 15, in the conventional manner, causes movement of a helicopter swash plate 16 through movement of the control means 13 and 14 suitably connected thereto to control the pitch and roll of the swash plate 16. Roll indicator servo motor or like device 11 and pitch indicator servo motor or like device 12, being mechanically coupled for purposes of illustration to the control means 13 and 14, cause operation of a pair of synchronously coupled servo motors or like devices in the instrument 10 as will be explained in detail hereinafter.

A climb and bank unit 17 containing a conventional electrically driven gyroscope having a vertical spin axis is connected to a pair of servo motors or like devices within the instrument 10, as will be explained in detail hereinafter, for the pitch and roll axis of the aircraft itself. Unit 17 will supply an electrical signal in accordance with the relative attitude between the aircraft itself and the horizontal position to which it is directed in both the pitch and roll axis in a well-known manner.

Referring now to FIGURES 2 and 3 where there is shown the preferred form of an aircraft instrument constructed in accordance with our invention, the instrument 10 comprises a horizontally disposed miniaturized aircraft replica 20 fixedly attached on a vertical hollow rod 21. Hollow rod 21 is suitably affixed to a hollow semispherical downwardly opening base 22 and extends therethrough. Base 22 is in turn attached by any suitable means to a hollow upwardly opening semi-spherical base cover 23 which forms part of the enclosure, indicated in its entirety as 24, for the instrument, the details of which will be explained more in detail.

Replica 20 being fixedly mounted with respect to base 22 and base cover 23, in the embodiment shown, is fixedly attached to move with the aircraft through the attachment of the enclosure 24 to the aircraft itself thus forming an integral part of the aircraft. Replica 20, being disposed intermediate the ends of the rod 21, is constructed and arranged to be on the same horizontal plane with a U-shaped gimbal 25 and a horizontally mounted circular compass ring 26; the latter being of smaller outer diameter than the inner edges of, and disposed within, arms 27 and 28 of the gimbal 25. Attached to the radially inward edge of the compass ring 26 and partially surrounding the replica 20, is a hollow hemispherical enclosure means 30 which moves with the compass ring. Gimbal 25 is connected to the instrument housing 31, which forms part of the enclosure 24, through a fore and aft axis bearing, and is rotated by gearing 32a driven by a servo motor or the like device 32 whereby the servo motor causes a raising or lowering of arms 27 and 28 with respect to the replica 20. Actually under flight conditions, it is the gimbal 25 that remains horizontal to represent the earth's horizon to which the roll of the aircraft and replica 20 will be referenced. The operation of the servo motor 32 to cause the gimbal to remain horizontal when the aircraft is banking or rolling is in response to the signal received in the servo motor 32 from the pitch and roll unit 17 to which it is connected.

The outer extremities of the arms 27 and 28 of the gimbal have a pair of servo motors or like devices 33 and 34 which are conveniently located with respect to the housing so that they may move upwardly or downwardly, respectively, with the movement of the arms of the gimbal in response to any roll of the aircraft and are constructed and arranged to be operable in any position of the arms. Servo motor 33 being connected to the climb and bank unit 17 causes the forward portion (as viewed in the drawings) of the compass ring 26 and the hemispherical means to move upwardly or downwardly (and the backward portion thereof to move correspondingly downwardly or upwardly) to indicate the pitch of the aircraft. Actually, it is the compass and hemispherical means which remains horizontal, with the replica (by reason of its departures from horizon—as indicated with reference to the compass ring and hemisphere) indicating the pitch of the aircraft. Servo motor 34 being suitably connected to an output servo motor or like device of a gyroscopic compass or like device, indicated in its entirety as 35, causes movement of the compass ring 26 according to the heading of the aircraft in a well-known manner.

In more particularity, an attaching means 36, having a pair of outwardly extending arms 37 and 38 of the same curvature as the periphery of the compass ring 26 and further having an oppositely radially outwardly extending cylindrical arm 40 for receiving shaft 41 of the servo motor, connects the compass ring 26 to the servo motor 33 to cause rotation of the compass ring in a direction normal to the axis of the gimbal in response to a signal received from climb and bank unit 17. The compass ring is also provided with peripheral gear teeth which intermesh with a worm gear 42 which in turn is connected to shaft 43 of the servo motor 34 through intermeshing gears 44 whereby rotation of the shaft 43 in response to a signal received from the gyroscopic compass 35 causes the compass ring 26 to rotate horizontally about its axis. Thus, it can be seen that the wing tips 45 and 46 of the replica 20 being fixedly mounted with respect to the aircraft itself form instrument pointers which indicate to the pilot any roll or bank of the aircraft by the relationship between the compass ring 26 and the wing tips. In addition, any climb or descent of the aircraft will be discernible by the relationship of the nose and the compass ring. Thus, as can be seen, the three-dimensional visual relationship between the replica and the compass duplicates precisely the activity of the aircraft with respect to the earth and for that reason instrument flying by our invention is greatly improved.

Turning now to FIGURES 3, 5 and 6, it can be seen that a pair of coaxial rods 50 and 51 are slidably disposed in the hollow rod 21, project beyond the lower end of rod 21, and are connected to servo motors or like devices. Rod 50 is fixedly attached at its lower end to one end of an arm 52. The other end of arm 52 is threadably connected to a rotatable screw 53. Screw 53, being fixedly connected to rotatable shaft 54 of servo motor 55 causes the arm 52 to move upwardly or downwardly dependent upon the direction of rotation of shaft 54. Movement upwardly or downwardly of the arm 52 causes a corresponding movement upwardly or downwardly of the rod 50. In a similar manner, rod 51 (in this embodiment slidably disposed within the rod 50) is connected at its lower end to one end of an arm 56. The opposite end of arm 56 is threadably connected to a rotatable screw 57 which in turn is fixedly connected to shaft 58 of servo motor 60. Rotation of the shaft 58 causes movement upwardly or downward of the arm 56 and concurrent movement upward or downward of the rod 51 in a manner similar to that described in connection with rod 50.

The upper end of rod 50 is provided with a curved downwardly extending arm 61 pivotally mounted at one end to a collar 62 fixedly attached to the rod. The other end of the curved arm 61 is pivotally connected to a relatively flat circular plate-like member 63, located in this embodiment, below the ends of the two rods 50 and 51 on a level with the upper end of rod 21. This plate-like member 63 is a replica of the helicopter swash plate 16 and is an attitude indicating device as will be explained hereinafter. Similarly, the upper end of rod 51 is provided with a curved downwardly extending arm 64 pivotally mounted at one end to a collar 65 fixedly attached to the rod. The other end of curved arm 64 is pivotally connected to the plate member 63 but it is to be noted that arm 64 and its connection to plate member 63 is located normal to the curved arm 61 and its connection to plate member 63.

Plate member 63 is pivotally mounted for universal movement about the rods 21, 50 and 51 through the medium of a second, radially centrally located, circular member 66 of smaller outer diameter than the inner diameter of the plate member 63 and spaced slightly therefrom to provide freedom of movement of the two plates. Plate member 63 is pivotally mounted for movement in one direction, for example, downward or upward movement of the left portion of the plate as viewed in FIGURE 6, by a pair of pins or the like 67 located diametrically opposed to each other and fixed between the two plates. Additionally, plate member 63 is mounted for pivotal movement about the axis normal to the axis of movement viewed in FIGURE 6 (see FIGURE 5) by pivotally mounting the second plate member 66 to a collar 68 by diametrically opposed pins 70 fixedly attached between the collar 68 and the plate 66.

From the above description it can be seen that movement of the rod 50 upwardly or downwardly by operation of the servo motor 55 will cause movement upward or downward of the plate-like member (swash plate replica) 63 about one axis through operation of the pivotally mounted arms 61. Similarly, upward or downward movement of rod 51 by operation of the servo motor 60 will cause upward or downward movement of the replica plate 63 about an axis normal to the axis of rotation to the plate by operation of arm 61 through the operation of the pivotally mounted arm 64.

Thus, as can clearly be seen from FIGURES 2 and 3, movement of the swash plate replica 63 by operation of the servo motor 55 will duplicate the bank or roll of the swash plate 16 from the signal received from the roll indicator or servo motor 12 to which it is connected. Similarly, movement of the swash plate replica 63, by operation of the servo motor 60 from the signal received from the pitch servo motor 11, will duplicate the pitch of the swash plate 16. By comparing the attitude of the swash plate replica 63 with reference to the compass ring 26 or, for example, with the top portion of the globe-like indicator 30, the true attitude of the swash plate 16 with respect to the earth will be presented to the pilot. As is well known, the direction of flight of the helicopter with respect to the earth is determined by the attitude of the swash plate regardless of the attitude of the fuselage of the helicopter. Thus, the exact circumstances of the helicopter fuselage attitude, heading, etc. as well as the attitude of the helicopter swash plate is reproduced for the pilot by our invention as a three-dimensional presentation, thus requiring less interpretation and less loss of time to the pilot.

It is to be noted also that our device is a rather simple compact instrument and, as shown, is surrounded by the enclosure 24 so that it may be conveniently located for viewing by the pilot. Enclosure 24 encloses our instrument by a diagonally located plate 72 conveniently fitted over and attached to the base member 23 and the enclosure is provided with suitable false bases or cavities 73 to conceal any of the wiring and servo motors if desirable. While we have shown the enclosure 72 as suitable for mounting on an instrument panel, obviously, our invention is equally well suited for mounting on a pedestal or any other convenient place.

From the foregoing description of our invention, it can be seen that our invention comprises in its broadest aspects a three-dimensional simulation of the activity of the helicopter fuselage and the helicopter swash plate attitudes with respect to the earth.

While the various parts herein have been described as upper or lower or in a right or left position, such description refers only to the relative position of the parts as shown in the drawings and is not intended to be a limitation of the invention.

We claim:

1. In combination with a helicopter, a helicopter attitude indicator comprising, helicopter and swash plate replicas and an artificial horizon adapted to be effectively viewed from an oblique angle, means for mounting said helicopter replica in permanent alignment and relationship with said helicopter, means mounting said swash plate replica and said artificial horizon in movable relationship with each other and with said helicopter replica, means for controlling said swash plate replica so that the latter assumes the same attitude as the swash plate on the helicopter, said artificial horizon surrounding both of said replicas, and means for controlling said artificial horizon to maintain the latter in parallel relationship to the horizon whereby said replicas and artificial horizon when viewed perspectively will assume a 3-dimensional effect of the exact attitude that the helicopter and the helicopter swash plate have with the horizon.

2. In combination with a helicopter, a helicopter attitude indicator comprising, helicopter and swash plate replicas and an artificial horizon adapted to be effectively viewed from an oblique angle, means for mounting said helicopter replica in permanent alignment and relationship with said helicopter, means mounting said swash plate replica and said artificial horizon in movable relationship with each other and with said helicopter replica, means for controlling said swash plate replica so that the latter assumes the same attitude as the swash plate on the helicopter and superimposed over but spaced from said helicopter replica in the manner of the swash plate of the helicopter, said artificial horizon surrounding both of said replicas, and means for controlling said artificial horizon to maintain the latter in parallel relationship to the horizon whereby said replicas and artificial horizon when viewed perspectively will assume a 3-dimensional effect of the exact attitude that the helicopter and the helicopter swash plate have with the horizon.

3. In combination with a helicopter, a helicopter attitude indicator comprising, helicopter and swash plate replicas and an artificial horizon adapted to be effectively viewed from an oblique angle, means for mounting said helicopter replica in permanent alignment and relationship with said helicopter, means mounting said swash plate replica and said artificial horizon in movable relationship with each other and with said helicopter replica, means for controlling said swash plate replica so that the latter assumes the same attitude as the swash plate on the helicopter, said artificial horizon surrounding both of said replicas, and means for controlling said artificial horizon to maintain the latter in parallel relationship to the horizon whereby said replicas and artificial horizon when viewed perspectively will assume a 3-dimensional effect of the exact attitude that the helicopter and the helicopter swash plate have with the horizon, azimuth indicia on said artificial horizon, and means mounting said artificial horizon for azimuthal rotation relative to the helicopter to render said artificial horizon operable to indicate the heading of the helicopter according to the position of the artificial horizon in relationship to the helicopter replica.

4. In combination with a helicopter, a helicopter attitude indicator comprising helicopter and swash plate replicas and an artificial horizon adapted to be effectively viewed from an oblique angle, means for mounting said helicopter replica in permanent alignment and relationship with said helicopter, means mounting said swash plate replica and said artificial horizon in movable relationship with each other and with said helicopter replica, means for controlling said swash plate replica being so that the latter assumes the same attitude as the swash plate on the helicopter and superimposed over but spaced from said helicopter replica in the manner of the swash plate of the helicopter, said artificial horizon surrounding both of said replicas, and means for controlling said artificial horizon to maintain the latter in parallel relationship to the horizon whereby said replicas and artificial horizon when viewed perspectively will assume a 3-dimensional effect of the exact attitude that the helicopter and the helicopter swash plate have with the horizon, azimuth indicia on said artificial horizon, and means mounting said artificial horizon for azimuthal rotation relative to the helicopter to render said artificial horizon operable to indicate the heading of the helicopter according to the position of the artificial horizon in relationship to the helicopter replica.

5. In combination with a helicopter, a helicopter attitude indicator comprising, an indicator housing mounted in said helicopter and helicopter and swash plate replicas and an artificial horizon mounted in said housing, and adapted to be effectively viewed from an oblique angle, means for mounting said helicopter replica in permanent alignment and relationship with said helicopter; means mounting said swash plate replica and said artificial horizon in movable relationship with each other and with said helicopter replica, means for controlling said swash plate replica so that the latter assumes the same attitude as the swash plate on the helicopter, said artificial horizon surrounding both of said replicas, and means for controlling said artificial horizon to maintain the latter in parallel relationship to the horizon whereby said replicas and artificial horizon when viewed perspectively will assume a 3-dimensional effect of the exact attitude that the helicopter and the helicopter swash plate have with the horizon.

6. In combination with a helicopter, a helicopter attitude indicator comprising, an indicator housing mounted in said helicopter and helicopter and swash plate replicas and an artificial horizon mounted in said housing, and adapted to be effectively viewed from an oblique angle, means mounting said helicopter replica in permanent alignment and relationship with said helicopter, means mounting said swash plate replica and said artificial horizon in movable relationship with each other and with said helicopter replica, means for controlling said swash plate replica so that the latter assumes the same attitude as the swash plate on the helicopter and superimposed over but spaced from said helicopter replica in the manner of the swash plate of the helicopter, said artificial horizon surrounding both of said replicas, and means for controlling said artificial horizon to maintain the latter in parallel relationship to the horizon whereby said replicas and artificial horizon when viewed perspectively will assume a 3-dimensional effect of the exact attitude that the helicopter and the helicopter swash plate have with the horizon.

7. In combination with a helicopter, a helicopter attitude indicater comprising, an indicator housing mounted in said helicopter and helicopter and swash plate replicas and an artificial horizon mounted in said housing, and adapted to be effectively viewed from an oblique angle, means for mounting said helicopter replica in permanent alignment and relationship with said helicopter, means mounting said swash plate replica and said artificial horizon in movable relationship with each other and with said helicopter replica, means for controlling said swash plate replica so that the latter assumes the same attitude as the swash plate on the helicopter, said artificial horizon surrounding both of said replicas, and means for controlling said artificial horizon to maintain the latter in parallel relationship to the horizon whereby said replicas and artificial horizon when viewed perspectively will assume a 3-dimensional effect of the exact attitude that the helicopter and the helicopter swash plate have with the horizon, said artificial horizon further having controlling means therefor responsive to the heading of the helicopter and having indicia to indicate the heading of the helicopter according to the position of the artificial horizon in relationship to the helicopter replica.

8. A helicopter attitude indicator comprising: a helicopter replica, a base for fixedly mounting in a helicopter fuselage and on which said replica is fixedly mounted so that said replica can be viewed from an oblique angle; a swash plate replica, means mounting said swash plate replica on said base and in movable relationship with said helicopter replica for movement corresponding to the attitude of a helicopter swash plate; and artificial horizon means surrounding said above replicas and means mounting said horizon means tiltably on said base and adapted to be connected to means whereby said horizon means maintains a parallel relationship to the horizon whereby said replicas and artificial horizon when viewed perspectively will assume a 3-dimensional effect.

9. A helicopter attitude indicator comprising: a helicopter replica, a base for fixedly mounting in a helicopter fuselage and on which said replica is fixedly mounted so that said replica can be viewed from an oblique angle; a swash plate replica, means mounting said swash plate replica on said base and in movable relationship with said helicopter replica; and artificial horizon means surrounding said above replicas and adapted to be connected to means whereby said horizon means maintains a parallel relationship to the horizon whereby said replicas and artificial horizon when viewed perspectively will assume a 3-dimensional effect, said horizon means further having means mounting it for azimuthal movement relative to said helicopter replica and being adapted to be connected to means whereby said horizon means will be responsive to the heading of the helicopter and said horizon means having indicia representing heading according to its relationship with said helicopter replica.

10. A helicopter attitude indicator comprising: an indicator housing for fixedly mounting in a helicopter fuselage; a helicopter replica fixedly mounted within said housing; a viewing port in said housing whereby said replica can be viewed from an oblique angle; a swash plate replica, means mounting said swash plate replica on said housing and in movable relationship with said helicopter replica; and artificial horizon means surrounding said above replicas and adapted to be connected to means whereby said horizon means maintains a parallel relationship to the horizon whereby said replicas and artificial horizon when viewed perspectively will assume a 3-dimensional effect.

11. A helicopter attitude indicator comprising: an indicator housing for fixedly mounting in a helicopter fuselage; a helicopter replica fixedly mounted within said housing; a viewing port in said housing whereby said replica can be viewed from an oblique angle; a swash plate replica, means mounting said swash plate replica on said housing and in movable relationship with said helicopter replica; and artificial horizon means surrounding said above replicas and adapted to be connected to means whereby said horizon means maintains a parallel relationship to the horizon whereby said replicas and artificial horizon when viewed perspectively will assume a 3-dimensional effect, said horizon means further having means mounting it for azimuthal movement relative to said helicopter replica and being adapted to be connected to means whereby said horizon means will be responsive to the heading of the helicopter and said horizon means having indicia representing heading according to its relationship with said replica.

References Cited in the file of this patent

UNITED STATES PATENTS

| | | |
|---|---|---|
| 2,567,212 | Klopp | Sept. 11, 1951 |
| 2,702,169 | Cannon et al. | Feb. 15, 1955 |
| 2,702,170 | Linnaberry | Feb. 15, 1955 |
| 2,782,395 | Hammond | Feb. 19, 1957 |